April 26, 1966   R. H. BAUMAN   3,247,670
MASTER CYLINDER WITH IN-LINE COMPENSATING VALVE
Filed March 23, 1964   2 Sheets-Sheet 1
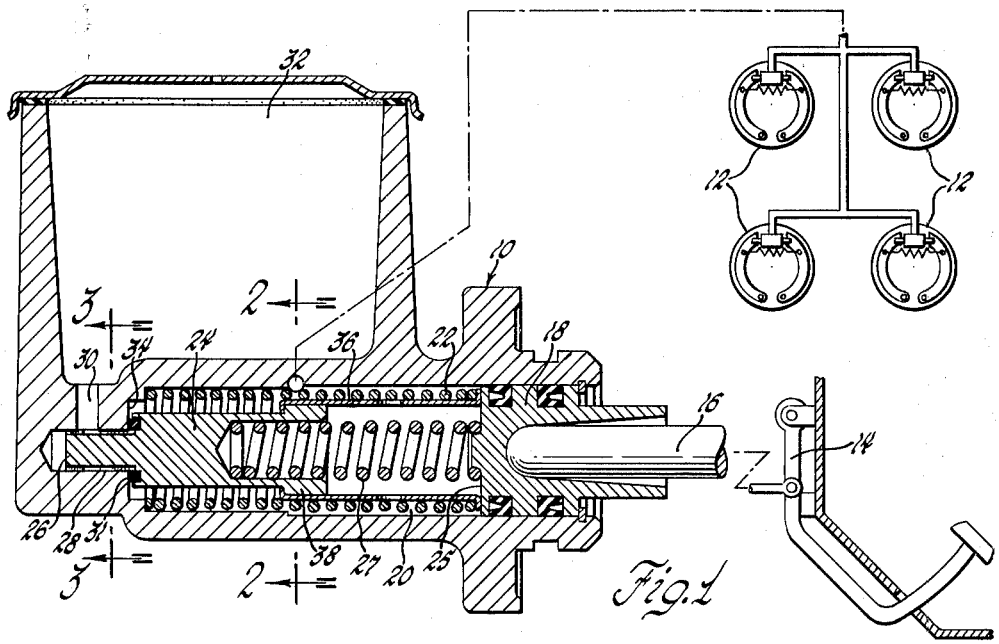
Fig. 1
Fig. 2
Fig. 3
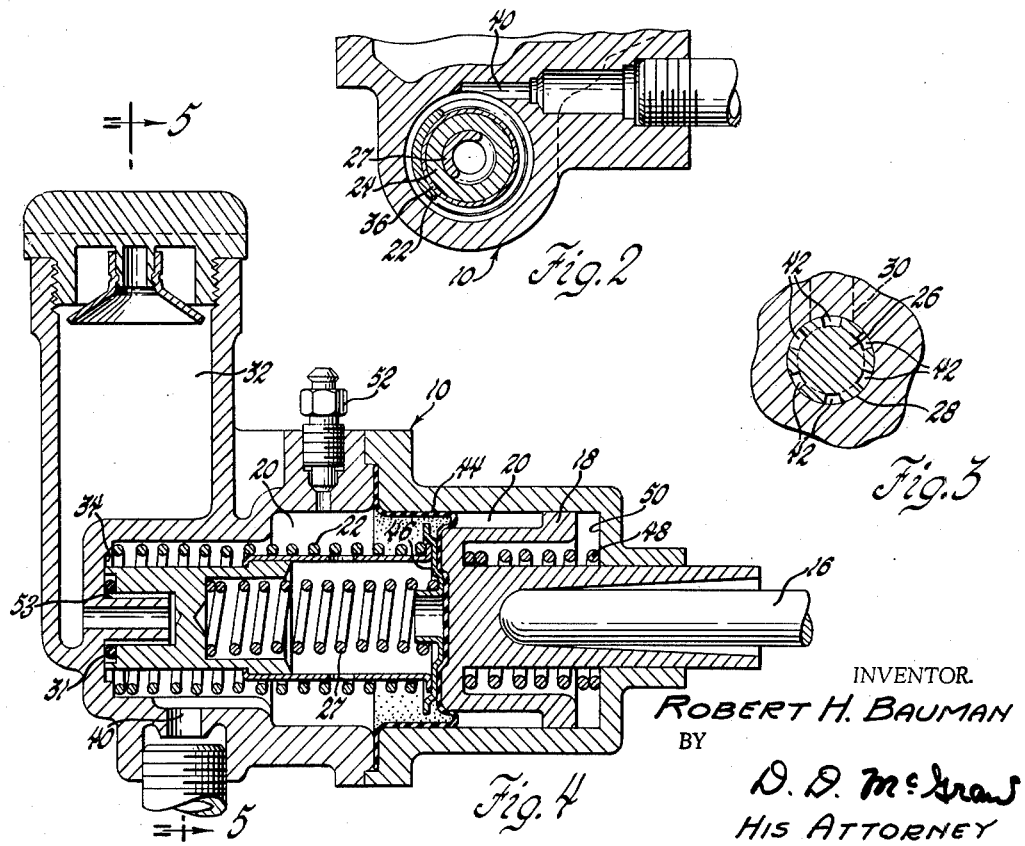
Fig. 4
INVENTOR.
ROBERT H. BAUMAN
BY
D. D. McGraw
HIS ATTORNEY April 26, 1966 R. H. BAUMAN 3,247,670
MASTER CYLINDER WITH IN-LINE COMPENSATING VALVE
Filed March 23, 1964 2 Sheets-Sheet 2

INVENTOR.
ROBERT H. BAUMAN
BY
D. D. McGraw
HIS ATTORNEY

United States Patent Office 3,247,670
Patented Apr. 26, 1966

3,247,670
MASTER CYLINDER WITH IN-LINE
COMPENSATING VALVE
Robert H. Bauman, Dayton, Ohio, assignor to General
Motors Corporation, Detroit, Mich., a corporation of
Delaware
Filed Mar. 23, 1964, Ser. No. 353,938
3 Claims. (Cl. 60—54.6)

This invention relates to hydraulic mechanisms and more particularly to a master cylinder having an in-line compensating valve.

It is common in the construction of master cylinders for hydraulic mechanisms to have compensating ports cut into the wall of the cylinder bore portion. This type of arrangement accomplishes the task of transferring fluid from an hydraulic reservoir into the hydraulic system upon a need established in the system. However a disadvantage to this type of arrangement is the passage of a piston and/or a seal over the compensating ports cut into the wall of the bore which causes the piston wall or the seals thereon to have a very short life.

It is an object of the present invention to provide an improved master cylinder wherein the compensating means are not placed in the power piston wall.

It is another object of the present invention to provide an improved master cylinder compensating valve mechanism which is entirely pressure responsive.

It is still another object of the present invention to provide an improved master cylinder which will be automatically compensated when expansion of fluid in the chamber takes place by virtue of increased heating.

It is a further object of the present invention to provide an improved master cylinder for a clutch mechanism which has a piston biased into the actuated position in order to provide a slightly increased static pressure.

It is still a further object of the present invention to provide an improved master cylinder which has a compensating valve responsive to pressure which will maintain the hydraulic system in which the master cylinder is placed always full of hydraulic fluid.

Further objects and advantages of the present invention will be apparent from the following description, reference being had to the accompanying drawings wherein preferred embodiments of the present invention are clearly shown.

In the drawings:

FIGURE 1 is a sectional view of the subject invention shown as a master cylinder in a diagrammatic illustration of a vehicle braking system;

FIGURE 2 is a sectional view taken along line 2—2 of FIGURE 1;

FIGURE 3 is a partial sectional view taken along line 3—3 of FIGURE 1;

FIGURE 4 is a sectional view of a modification of the subject invention;

Figure 5:
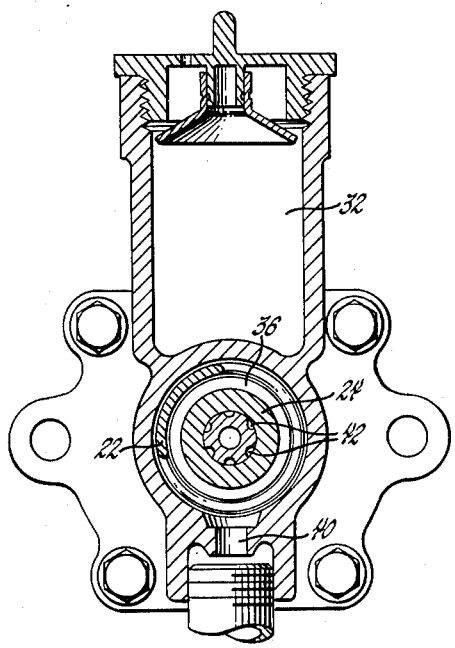
FIGURE 5 is a sectional view taken along line 5—5 of FIGURE 4.

Referring now to FIGURE 1, an hydraulic master cylinder 10 is illustrated in its operative location in a vehicle braking system having wheel brakes 12. The braking system illustrated is actuated by a pendantly supported brake pedal 14 pivotally engaging an actuator push rod 16.

A power piston 18 is slidably disposed for translation movement within a bore 20 of the master cylinder 10. A spring 22 urges the power piston 18 to a position of rest at one extreme of translational movement. A compensating valve 24 is biased away from a face 25 of the power piston 18 by a spring 27. An elongated portion 26 of the compensating valve 24 is piloted in a cylindrically shaped conduit 28 connecting with a passage 30 to a reservoir 32. The reservoir 32 maintains a supply of hydraulic fluid in readiness to fill the braking system and, in its preferred form, is an integral part of the master cylinder casting.

An O-ring seal 31 is disposed against one face of the compensating valve 24 and is adapted to seal against a surface 34 of the bore 20. It is understood that the O-ring seal 31 can take any cross sectional configuration that is adaptable for use in a system having a pressure operating range higher or lower than that of a vehicle braking system. A valve retractor sleeve 36 engages the compensating valve 24 on a flange 38. Another end of the valve retractor sleeve 36 is attached to the face 25 of the power piston 18 in any well-known manner. It becomes apparent, therefore, that the compensating valve 24 will be pulled toward the right, as viewed in FIGURE 1, as the power piston 18 is returned to the position illustrated. When the power piston 18 is pushed leftwardly in a pressurizing manner in the bore 20, the compensating valve 24 will not be affected since the valve retractor sleeve 36 will freely ride along the outer periphery of the valve 24.

Referring now to FIGURE 2, a cross sectional configuration of parts within the bore 20 is shown and an outlet 40 to the braking system is clearly illustrated.

Referring now to FIGURE 3, the extension 26 is piloted in the conduit 28 and has a series of peripheral slots 42 in the outer surface as clearly illustrated. The slots 42 serve to provide a controlled fluid flow between the reservoir 32 and the bore 20 during the operation of the system.

In operation, the braking system illustrated in FIGURE 1 is actuated by pressure exerted on the pedal 14. The pedal 14 is pivoted and the push rod 16 is caused to drive the power piston 18 to the left against the force of the spring 22. The movement of the power piston 18 to the left carries the spring 27 into firmer engagement with the compensating valve 24 and the compensating valve 24 will move the O-ring seal 31 into engagement with surface 34 of the bore 20. Fluid will be displaced in the bore 20 by the moving power piston 18 and hydraulic pressure will be provided in the vehicle brakes 12 through the outlet 40. It should be noted that the O-ring seal 31 prevents the passage of fluid through the conduit 28 and the passage 30 into the reservoir 32.

As pressure is released from the push rod 16, a reaction force in the vehicle brakes will cause reverse pressure in the outlet 40 and will attempt to pass fluid into the bore 20. As the piston 18 draws closer to the position of rest illustrated in FIGURE 1, a negative pressure will be created in the bore 20 which cannot be compensated for completely by the fluid returning from the vehicle brakes if the return flow capability of the brake line is less than the flow requirement created by movement of piston 18, or if the pressurized portion of the braking system is low on fluid. In this case, the compensating valve 24 will be drawn from its seat by the negative pressure in the bore 20 and fluid will be caused to flow from the reservoir 32, through the passage 30, through the conduit 28, and into the bore 20. As the piston 18 completes its travel, the negative pressure will cease and the spring 27 will maintain the compensating valve 24 in a poised position away from the surface 34 of the bore 20. During this period of time, there will be free fluid communication between the reservoir 32 and the bore 20.

Referring now to FIGURE 4, another modification of the subject invention is shown and, in the description thereof, the same reference numerals as applied to the modification described in FIGURE 1 will apply except where a substantial structural change exists.

The piston 18, as illustrated in this modification, is of a different design that the power piston 18 in FIGURE 1. A rolling diaphragm 44 is held against the face 25 of the power piston 18 and is secured to the periphery of the bore 20 in any well-known manner. A diaphragm retainer 46 is secured to the power piston in any well-known manner and serves the dual purpose of maintaining the diaphragm flush against the face 25 as well as locating the ends of the springs 27 and 22. A spring 48 urges the piston 18 off its seat against a wall 50 of the cylinder 10.

A bleed screw arrangement 52 is disposed through one wall of the master cylinder 10 and establishes a fluid communication between the bore 20 and the exterior of the master cylinder. The compensating valve 24 is so constructed as to be piloted on the exterior of the conduit 28. In this modification in FIGURE 4, the slots 42, as illustrated in FIGURE 3, are formed on the external periphery 53 of the conduit 28. The embodiment illustrated in FIGURE 4 is particularly useful in an application in which a slave or servo unit having zero lash is utilized.

In operation, the push rod 16 is actuated into driving engagement with the piston 18 in any well-known manner. The pressure build-up occurs in the bore 20 in front of the advancing diaphragm 44 and pressure is immediately felt in the outlet line 40 to the fluid operable device attached thereto, for example, a clutch. It should be noted that there is constantly a higher than atmospheric pressure in the bore 20 during a static condition of the system due to the biasing force of the spring 48 against the back side of the power piston 18. In this embodiment, it should also be noted that the compensating valve 24 is normally biased against the surface 34 of the bore 20 and the O-ring 31 seals the bore 20 from the conduit 28, the passage 30, and the reservoir 32. In an application where the master cylinder illustrated is used in a clutch system, the increased pressure in the bore 20 will serve to keep the throw-out bearing in the clutch against the throw-out fingers.

As a clutch facing wears, throw-out fingers will force a throw-out bearing to move the power piston 18 further to the right in the bore 20 which will force fluid back into the bore 20. This will cause movement of the power piston to the right compressing the spring 48. As this occurs, the valve retractor 36 will pull the compensating valve 24 away from its seat against the surface 34 and fluid will then flow from the reservoir 32 through the conduit 28 into the bore 20 until the pressure is equalized between the reservoir and the bore 20. As the pressure is equalized, the spring 27 will again drive the compensating valve 24 into sealing engagement with the surface 34 of the bore 20. In this manner, the master cylinder herein described serves to provide an adjustment for a clutch mechanism as the clutch face wears.

Figure 7:
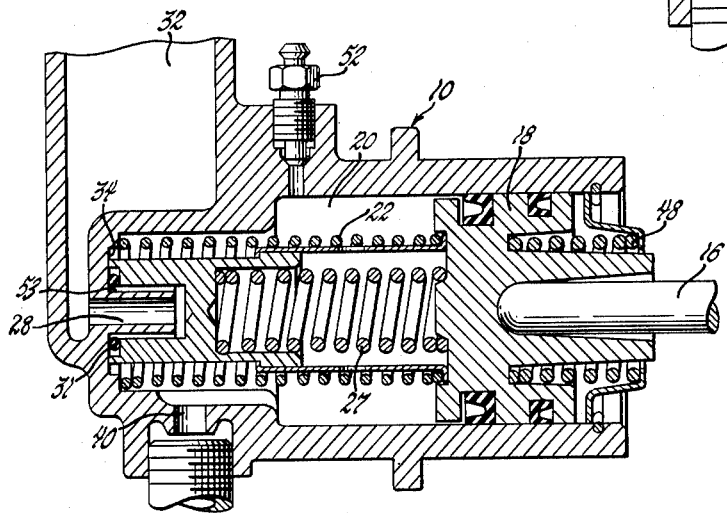
FIGURE 7 is a partial sectional view of another modification of the subject invention.

The rolling diaphragm 44 illustrated in this embodiment is preferred in a system where absolute protection against fluid leakage past the power piston 18 is desired. It is understood that, in an application where pressure feed-back and fluid leakage is not a critical problem, the more economical and conventional piston and O-ring arrangement could be used, such as illustrated in FIGURE 7.

Figure 6:
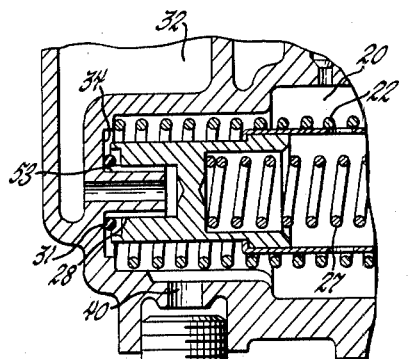
FIGURE 6 is a partial sectional view of a modification of the subject invention.

FIGURE 6 illustrates a modification of the master cylinder arrangement described in FIGURE 4, the internal structure being identical to that described in FIGURE 4 except that the spring 48 is omitted.

The embodiment in FIGURE 6 illustrates the compensating valve 24 poised for operation at a point out of contact with the surface 34 whereby fluid passage between the reservoir 32 and the bore 20 is possible at all times while there is no pressure in the system. The removal of the spring 48 in this embodiment causes the function of this modification to be exactly as that described in the modification illustrated in FIGURE 1. It should be noted that the compensating valve illustrated in this embodiment is piloted internally by being mounted around the conduit 28 substantially as illustrated in FIGURE 4.

The utility of the subject invention has been expanded somewhat by the illustrated various embodiments which would carry out functions in systems having different operating characteristics. Typical uses for the subject invention would be found in vehicle braking systems and vehicle clutch systems. The modification illustrated in FIGURE 4 is particularly adaptable for a clutch system. The valving illustrated in these embodiments is equally as adaptable for functioning with other fluids as the normally used hydraulic fluid, for example, air and water. It is also understood that various refinements of design could be undertaken in a given installation without departing from the spirit of the invention disclosed herein.

While the embodiments of the present invention, as herein disclosed, constitute preferred forms, it is to be understood that other forms might be adopted.

What is claimed is as follows:

1. A master cylinder for the developing of hydraulic pressure for a vehicle braking system, said master cylinder comprising: a cylinder body including a first and a second chamber, said first chamber being a bore, said second chamber being a fluid reservoir; fluid displacing means slidably disposed in the first chamber and adapted to be translationally moved therein; conduit means arranged to provide a path for fluid flow from the reservoir to the first chamber; and valve means including a piloting portion adapted for translational movement on a portion of the conduit means and biased into engagement with a seat on the conduit means by a spring; said fluid displacing means being biased into a first extreme of translational movement by spring means and being adapted to be pushed by an actuator into a second extreme of translational movement to develop pressure in the first chamber, movement of the fluid displacing means in a pressure developing direction causing the valve means to seal the conduit means from the passage of fluid from the first chamber to the reservoir, said fluid displacing means being responsive to release of pressure from the actuator to be moved by the spring means to said first extreme of translational movement, the fluid displacing means developing a negative pressure in the first chamber during the return motion thereby causing the valve means to be unseated from the conduit thereby allowing the flow of fluid from the reservoir into the first chamber, said fluid displacing means including biasing means and being movable in a non-pressure developing direction past a normal poised position to draw said valve means from its seat thereby equalizing pressure in said first and second chamber when the pressure in said first chamber exceeds the pressure in said second chamber and the excess pressure is induced by fluid expansion in the hydraulic braking system.

2. A master cylinder for an hydraulic braking system for a vehicle, said master cylinder comprising: a cylinder body having a reservoir and a pressurizing chamber, said pressurizing chamber having an outlet into the reservoir and an outlet into the braking system; piston means slidably disposed for translational movement in the pressurizing chamber and adapted to generate hydraulic pressure therein, said piston means being biased by a spring into a first extreme of translational movement; an inlet sleeve extending from the reservoir into the pressurizing chamber; and having peripherally formed passages adapted to allow fluid flow therethrough; sealing means carried in a fixed manner by said sleeve over said passages; and valve means including retractor means engaging said valve means and said piston means, said valve means slidably carried by the sleeve for translational movement relative thereto and to be driven into sealing engagement with a portion of the reservoir, said valve means being biased away from the piston means; said piston means being movable by an actuator toward a second extreme of translational movement whereby an hydraulic pressure is developed in the pressurizing chamber and the valve means is driven into sealing engagement with the portion of the reservoir; said piston means being returnable to a poised position by the cooperation of the biasing spring and a reaction from the braking system whereby a negative pressure is created in the pressurizing chamber and the valve means is drawn from its seat allowing the passage of fluid from the reservoir into the pressurizing chamber, the valve means thereafter being positioned in a poised disposition relative to the seat against the reservoir thereby allowing free pressure communication between the reservoir and the pressurizing chamber; said piston moving said retractor means and consequently said valve means from its seat in response to a condition of pressure build-up in said pressurizing chamber and in the hydraulic braking system to relieve excessive pressure to said reservoir.

3. A device according to claim 2 wherein the valve means is driven into re-engagement with the seat after having been moved therefrom by the negative pressure in the pressurizing chamber created by the returning piston means.

References Cited by the Examiner

UNITED STATES PATENTS

| | | | |
|---|---|---|---|
| 2,093,557 | 9/1937 | Heirdoff | 60—54.6 |
| 2,114,992 | 4/1938 | Bowen | 60—54.6 |
| 2,178,490 | 10/1939 | Nielsen | 60—54.6 |
| 2,765,625 | 10/1956 | Hart | 60—54.6 |

FOREIGN PATENTS 716,008  9/1954  Great Britain.

SAMUEL LEVINE, *Primary Examiner.*

EDGAR W. GEOGHEGAN, JULIUS E. WEST,
*Examiners.*